(12) United States Patent
Stein et al.

(10) Patent No.: US 9,304,784 B2
(45) Date of Patent: Apr. 5, 2016

(54) POSITIONALLY INFORMATIVE REMOTE DISPLAY SELECTION INTERFACE

(75) Inventors: Michael V. Stein, San Jose, CA (US); Dale A. Taylor, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 645 days.

(21) Appl. No.: 13/571,168

(22) Filed: Aug. 9, 2012

(65) Prior Publication Data

US 2014/0043210 A1 Feb. 13, 2014

(51) Int. Cl.
*G06F 9/44* (2006.01)
*G06F 3/14* (2006.01)

(52) U.S. Cl.
CPC ............ *G06F 9/4445* (2013.01); *G06F 3/1454* (2013.01); *G06F 3/1423* (2013.01); *G09G 2356/00* (2013.01)

(58) Field of Classification Search
None
See application file for complete search history.

(56) References Cited

U.S. PATENT DOCUMENTS

| | | | | |
|---|---|---|---|---|
| 5,758,110 A | * | 5/1998 | Boss et al. | 715/751 |
| 5,923,307 A | * | 7/1999 | Hogle, IV | G06F 3/04897 345/1.3 |
| 6,650,747 B1 | * | 11/2003 | Bala et al. | 379/265.06 |
| 7,667,707 B1 | | 2/2010 | Margulis | |
| 7,791,559 B2 | | 9/2010 | Piasecki | |
| 2010/0064228 A1 | * | 3/2010 | Tsern | 715/740 |
| 2010/0115020 A1 | | 5/2010 | Hochmuth et al. | |

OTHER PUBLICATIONS

Apple Computer, Inc., "Apple Remote Desktop Administrator's Guide", Version 3, 2006, 184 pages.

\* cited by examiner

*Primary Examiner* — David D Davis
(74) *Attorney, Agent, or Firm* — Morgan, Lewis & Bockius LLP (57) ABSTRACT

A user interface presented on a local display eases user discrimination between multiple remote displays connected to a remotely controlled computer, thereby easing selection of remote display(s) for remote viewing on the local display. The user interface can incorporate information indicating physical positional orientations of remote displays relative to each other, such as whether one remote display is physically located to the left of another remote display. The icons can additionally illustrate sizes of the remote displays relative to each other. Each remote display can be represented within a particular user interface icon as a rectangle whose size and position relative to the other remote display(s) reflect that remote display's actual physical size and position relative to those other remote display(s). Different icons can show different subsets of active and inactive remote monitors, and can be selected to activate different subsets of remote monitors for presentation on the local display.

24 Claims, 6 Drawing Sheets

POSITIONALLY INFORMATIVE REMOTE DISPLAY SELECTION INTERFACE

BACKGROUND

The present disclosure relates generally to user interfaces, and in particular to a user interface that enables the user selection of remote displays for viewing at a local display.

Computers and other electronic devices are capable of communicating with each other over networks such as local area networks, wide area networks, and the Internet. Approaches have been devised for allowing one computer to remotely control another computer over a network. Apple Remote Desktop, initially released by Apple Inc. on Mar. 14, 2002, is an example of a software application that enables such remote control. Further details about a recent release of Apple Remote Desktop may be found in "Apple Remote Desktop Administrator Guide Version 3.3," which is incorporated by reference herein. In the discussion below, the controlling computer, which is located in the user's immediate presence, and to which the user has physical access, is referred to as the "local computer." The remotely controlled computer, which is not necessarily located in the user's immediate presence, and to which the user does not necessarily have physical access, is referred to below as the "remote computer."

Often, in a remote control scenario, both the local computer and the remote computer will have directly connected displays or monitors, such as active-matrix liquid crystal displays. A display may be directly connected to a computer via a High Definition Multimedia Interface (HDMI), a Video Graphics Array (VGA) connector, a Digital Visual Interface (DVI), or some other physical data communication port. Alternatively, a display can be communicatively coupled to the computer using wireless technology. Additionally, using the "AirPlay" feature in Mac OS X 10.8, a user can mirror a display to some other display. Such technology can potentially be used to create a second display for a computer rather than just mirroring the contents of a display. Furthermore, in the case of a computer that is only used for remote access, there might not be actual hardware displays connected to that computer at all; under such circumstances, the computer can create virtual displays of any given width and height. On a Macintosh computer, one can set the logical arrangement of these virtual displays. As discussed herein, "displays" includes both physical and virtual displays. Each computer will send, to the display that is directly or otherwise connected to that computer, signals that the display then uses to render an image that will be visually shown on the display. In the discussion below, any display that is directly or otherwise connected to the local computer is referred to as a "local display." Any display that is otherwise directly connected to the remote computer is referred to below as "remote display."

In a remote control scenario, the remote computer will also send, over the network to the local computer, data indicative of the image that is currently being shown on the remote display. In response to receiving this data, the local computer sends, to the local display, signals that represent this data. The local display then uses these signals to render an image that is visually shown on the local display. Thus, the local display may show images that are currently being shown on the remote display, better enabling the user of the local computer to remotely control the remote computer.

Under some circumstances, multiple remote displays might be directly connected to the remote computer. Under such circumstances, the local computer may execute software that presents, on the local display, a user interface that enables the user of the local computer to select which one(s) of the remote displays are to have their currently presented images shown on the local display. The user interface may identify each remote display by a number, such as "Display 1" and "Display 2." The user interface also may indicate, for each display, what the current resolution settings for that display are. Unfortunately, the user of the local computer often cannot determine, based only on this meager information presented via the user interface, which remote display is currently showing the image that the user would like to view on the local computer. Even if the user has been to the remote site previously, the user might not know which of the multiple remote displays is being referred to in the user interface as "Display 1," and which of the multiple remote displays is being referred to in the user interface as "Display 2." Consequently, the user typically endures the aggravation of selecting the desired remote display through a trial-and-error process, in which the user selects each remote monitor in turn until the user sees the desired image on the local display.

SUMMARY

Certain embodiments of the present invention can present, on a local display, a user interface that makes it easier for a user of a local computer to discriminate between the identities of multiple remote displays directly connected to a remote computer, so that the user can more easily select the remote display(s) whose images the user wants to see shown on the local display. In certain embodiments of the invention, positional orientation information, which indicates the physical positional orientations of the remote monitors relative to each other at the remote site, can be incorporated into the user interface. For example, in certain embodiments of the invention, a user interface can include icons that illustrate a first remote display being to the left of a second remote display, indicating to the user that the first remote display is physically located to the left of the second display at the remote site. In certain embodiments of the invention, the icons can additionally illustrate sizes of the remote displays relative to each other. For example, in certain embodiments of the invention, if a first remote display is twice as large as a second remote display, then the user interface can include icons that illustrate the first remote display being twice as large as a second remote display. In certain embodiments, each remote display can be represented within a particular user interface icon as a rectangle whose size and position relative to the other remote display(s) reflect that remote display's actual physical size and position relative to those other remote display(s).

In certain embodiments of the invention, the user interface discussed above includes a series of icons, each illustrating the positional orientations of the remote displays relative to each other, and each representative of a different subset of those remote monitors currently being active for viewing on the local display. For example, in certain embodiments of the invention, a first icon can illustrate a left remote display being active concurrently with a right remote display being inactive, while a second icon can illustrate a left remote display being inactive concurrently with a right remote display being active, while a third icon can illustrate both the left and right remote displays being active concurrently. In such embodiments of the invention, a user's selection (e.g., via mouse click) of a particular one of the icons can cause (a) the activation of the remote displays illustrated in that particular icon as being active, simultaneous with (b) the deactivation of the remote displays illustrated in that particular icon as being inactive (if any). In certain embodiments of the invention, in response to the activation of one or more remote displays through user selection of a particular icon, images currently being presented on those activated remote displays are presented on the local display. Conversely, in certain embodiments of the invention, in response to the deactivation of one or more remote displays through user selection of a particular icon, images currently being presented on those deactivated remote displays cease to be presented on the local display.

The following detailed description together with the accompanying drawings will provide a better understanding of the nature and advantages of the present invention.

BRIEF DESCRIPTION

DETAILED DESCRIPTION

Figure 1:
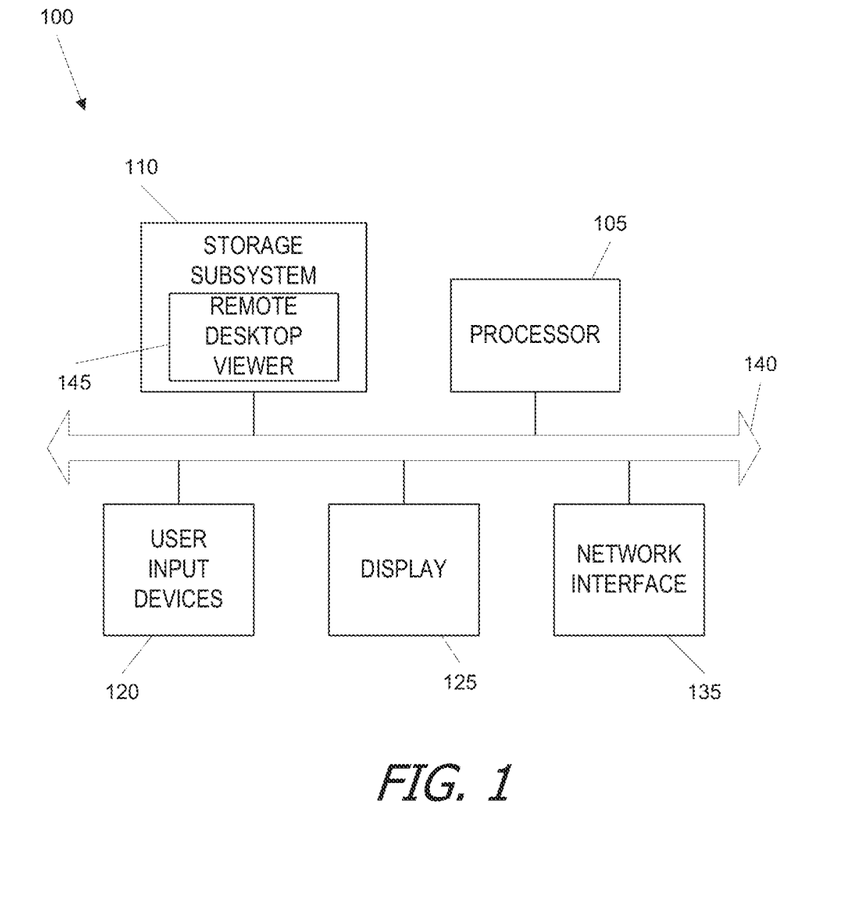
FIG. 1 is a block diagram of a computer system according to an embodiment of the present invention.

FIG. 1 illustrates a computer system 100 according to an embodiment of the present invention. Computer system 100 can be implemented as any of various computing devices, including, e.g., a desktop or laptop computer, tablet computer, smart phone, personal data assistant (PDA), or any other type of computing device, not limited to any particular form factor. Computer system 100 can include processing unit(s) 105, storage subsystem 110, input devices 120, display 125, network interface 135, and bus 140.

Processing unit(s) 105 can include a single processor, which can have one or more cores, or multiple processors. In some embodiments, processing unit(s) 105 can include a general-purpose primary processor as well as one or more special-purpose co-processors such as graphics processors, digital signal processors, or the like. In some embodiments, some or all processing units 105 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 105 can execute instructions stored in storage subsystem 110.

Storage subsystem 110 can include various memory units such as a system memory, a read-only memory (ROM), and a permanent storage device. The ROM can store static data and instructions that are needed by processing unit(s) 105 and other modules of electronic device 100. The permanent storage device can be a read-and-write memory device. This permanent storage device can be a non-volatile memory unit that stores instructions and data even when computer system 100 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that the processor needs at runtime.

Storage subsystem 110 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 110 can include removable storage media that can be readable and/or writeable; examples of such media include compact disc (CD), read-only digital versatile disc (e.g., DVD-ROM, dual-layer DVD-ROM), read-only and recordable Blu-Ray® disks, ultra density optical disks, flash memory cards (e.g., SD cards, mini-SD cards, micro-SD cards, etc.), magnetic "floppy" disks, and so on. The computer readable storage media do not include carrier waves and transitory electronic signals passing wirelessly or over wired connections.

In some embodiments, storage subsystem 110 can store one or more software programs to be executed by processing unit(s) 105, such as a remote desktop viewer 145. "Software" refers generally to sequences of instructions that, when executed by processing unit(s) 105 cause computer system 100 to perform various operations, thus defining one or more specific machine implementations that execute and perform the operations of the software programs. The instructions can be stored as firmware residing in read-only memory and/or applications stored in magnetic storage that can be read into memory for processing by a processor. Software can be implemented as a single program or a collection of separate programs or program modules that interact as desired. Programs and/or data can be stored in non-volatile storage and copied in whole or in part to volatile working memory during program execution. From storage subsystem 110, processing unit(s) 105 can retrieves program instructions to execute and data to process in order to execute various operations described herein.

A user interface can be provided by one or more user input devices 120, display device 125, and/or and one or more other user output devices (not shown). Input devices 120 can include any device via which a user can provide signals to computing system 100; computing system 100 can interpret the signals as indicative of particular user requests or information. In various embodiments, input devices 120 can include any or all of a keyboard, touch pad, touch screen, mouse or other pointing device, scroll wheel, click wheel, dial, button, switch, keypad, microphone, and so on.

Display 125 can display images generated by electronic device 100 and can include various image generation technologies, e.g., a cathode ray tube (CRT), liquid crystal display (LCD), light-emitting diode (LED) including organic light-emitting diodes (OLED), projection system, or the like, together with supporting electronics (e.g., digital-to-analog or analog-to-digital converters, signal processors, or the like). Some embodiments can include a device such as a touchscreen that function as both input and output device. In some embodiments, other user output devices can be provided in addition to or instead of display 125. Examples include indicator lights, speakers, tactile "display" devices, printers, and so on.

In some embodiments, the user interface can provide a graphical user interface, in which visible image elements in certain areas of display 125 are defined as active elements or control elements that the user can select using user input devices 120. For example, the user can manipulate a user input device to position an on-screen cursor or pointer over the control element, then click a button to indicate the selection. Alternatively, the user can touch the control element (e.g., with a finger or stylus) on a touchscreen device. In some embodiments, the user can speak one or more words associated with the control element (the word can be, e.g., a label on the element or a function associated with the element). In some embodiments, user gestures on a touch-sensitive device can be recognized and interpreted as input commands; these gestures can be but need not be associated with any particular array in display 125. Other user interfaces can also be implemented.

Network interface 135 can provide voice and/or data communication capability for electronic device 100. In some embodiments, network interface 135 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments, network interface 135 can provide wired network connectivity (e.g., Ethernet) in addition to or instead of a wireless interface. Network interface 135 can be implemented using a combination of hardware (e.g., antennas, modulators/demodulators, encoders/decoders, and other analog and/or digital signal processing circuits) and software components.

Bus 140 can include various system, peripheral, and chipset buses that communicatively connect the numerous internal devices of electronic device 100. For example, bus 140 can communicatively couple processing unit(s) 105 with storage subsystem 110. Bus 140 also connects to input devices 120 and display 125. Bus 140 also couples electronic device 100 to a network through network interface 135. In this manner, electronic device 100 can be a part of a network of multiple computer systems (e.g., a local area network (LAN), a wide area network (WAN), an Intranet, or a network of networks, such as the Internet. Bus 140 further enables communication between electronic device 100 and an accessory via accessory interface 155. Any or all components of electronic device 100 can be used in conjunction with the invention.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 105 can provide various functionality for electronic device 100. For example, processing unit(s) 105 can execute remote desktop viewer 145. In some embodiments, remote desktop viewer 145 is a software-based process that can cause images currently being presented on one or more remote displays to be shown on a local display such as display 125. In some embodiments, remote desktop viewer 145 presents, on local display 125, a user interface that indicates positional orientations of multiple remote displays relative to each other.

It will be appreciated that computer system 100 is illustrative and that variations and modifications are possible. Computer system 100 can have other capabilities not specifically described here (e.g., mobile phone, global positioning system (GPS), power management, one or more cameras, various connection ports for connecting external devices or accessories, etc.). Further, while computer system 100 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Multiple Remote Display Control System

Figure 2:
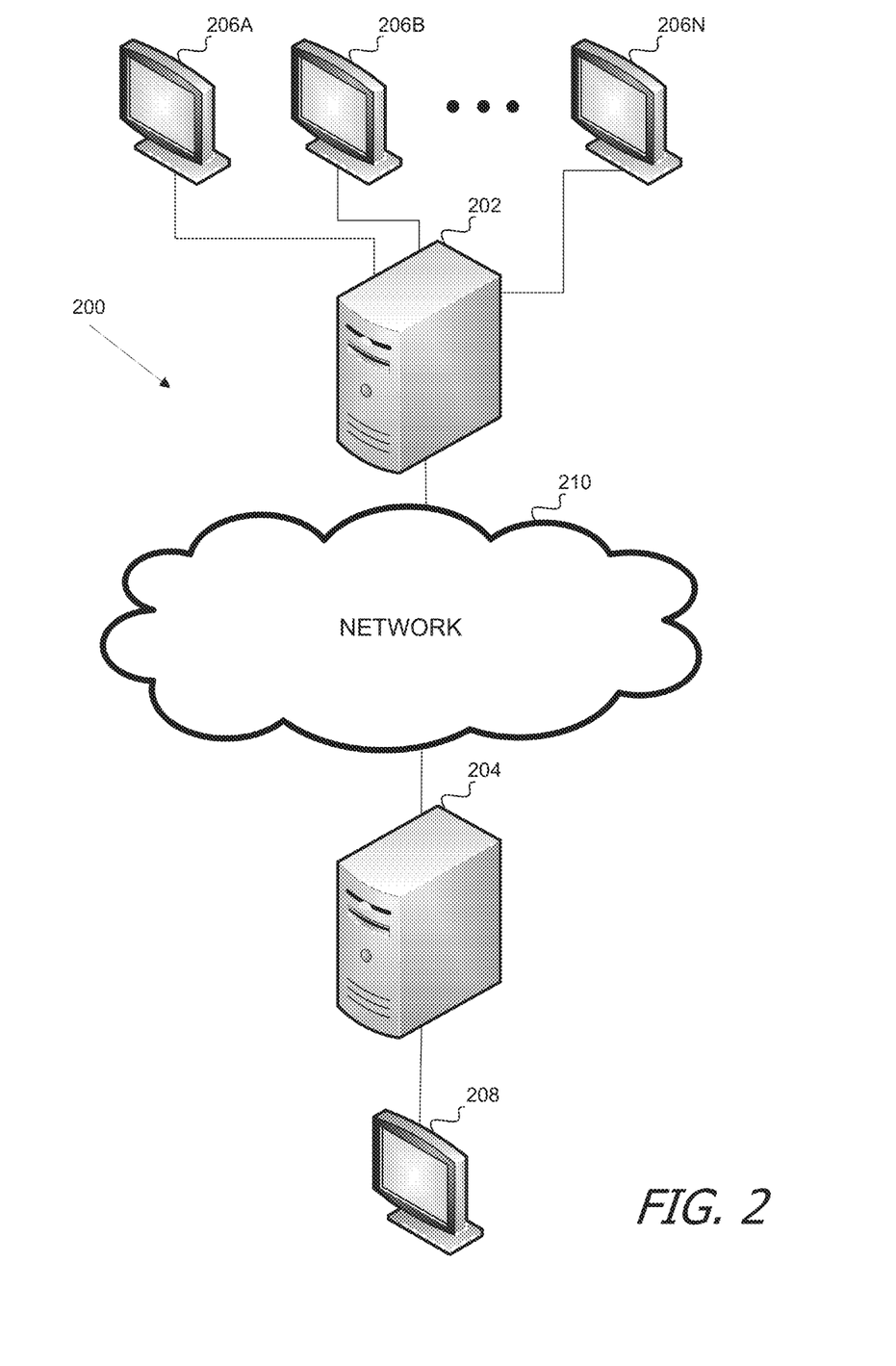
FIG. 2 is block diagram illustrating a system in which multiple remote displays can be remotely controlled and viewed on a local display, according to an embodiment of the invention.

FIG. 2 is a block diagram illustrating a system 200 in which multiple remote displays can be remotely controlled and viewed on a local display, according to an embodiment of the present invention. In the embodiment illustrated, system 200 includes a remote computer 202 and a local computer 204. Remote computer 202 can communicate with local computer 204 via a network 210, to which both remote computer 202 and local computer 204 can be communicatively connected via wired or wireless connections. Network 210 can be or can include a local area network, a wide area network, and/or the Internet. Displays 206A-N can be communicatively and directly connected to remote computer 204 via interfaces such as HDMI, VGA connectors, DVI, or other physical ports. Although multiple remote displays 206A-N are illustrated within system 200, various different embodiments of the invention can include various different quantities of remote displays. In one embodiment of the invention, there can be two remote displays. Displays 206A-N can be active-matrix liquid crystal displays, cathode ray tube displays, or any other type of display or monitor capable of rendering and showing images represented by signals that displays 206A-N can receive from remote computer 202. Remote computer 202 can send different signals representing different images to each of displays 206A-N concurrently, so that the images presented by each of displays 206A-N may differ from each other.

In one embodiment of the invention, a server application can execute on remote computer 202, while a client application can execute concurrently on local computer 204. These applications can communicate with each other over network 210 using a request-response communication model. Through these inter-application communications, local computer 204 can request and receive, from remote computer 202, data representing images from one or more of remote displays 206A-N. Remote computer 202 can be connected directly and communicatively with local display 208 using any of the connectivity options discussed above relative to remote computer 202 and remote displays 206A-N. In addition to an image that local computer 204 can generate and cause local display 208 to show, local computer 204 can additionally or alternatively cause local display 208 to show images represented by any of the data that local computer 204 receives from remote computer 202 over network 210. Thus, at any given time, local computer 204 can cause local display 208 to display images that are currently being shown on one or more of remote displays 206A-N.

In one embodiment of the invention, local computer 204 can cause local display 208 to display, concurrently, multiple images from multiple different ones of remote displays 206A-N. For example, local display 208 might present two separate frames concurrently, one of which contains an image that is being shown on remote display 206A, and the other of which contains an image that is being shown on remote display 206B. As the images on remote displays 206A-N change over time, remote computer 202 can send updated data over network 210 to local computer 204 in order to enable local computer 204 to update the corresponding images shown on local display 208.

In one embodiment of the invention, local computer 204 can generate a user interface that includes one or more icons that enable the user of local computer 204 to designate various different subsets of remote monitors 206A-N to be active and inactive for remote control purposes. In one embodiment of the invention the user's selection of a particular one of these icons can (a) cause local computer 204 to cause local display 208 to begin showing images from those of remote monitors 206A-N designated to be active according to that particular icon and simultaneously (b) cause local computer 204 to cause local display 208 to cease showing images from those of remote monitors 206A-N designated to be inactive according to that particular icon. An example of a user interface with selectable icons is discussed in further detail below.

Positionally Informative User Interface

Figure 3:
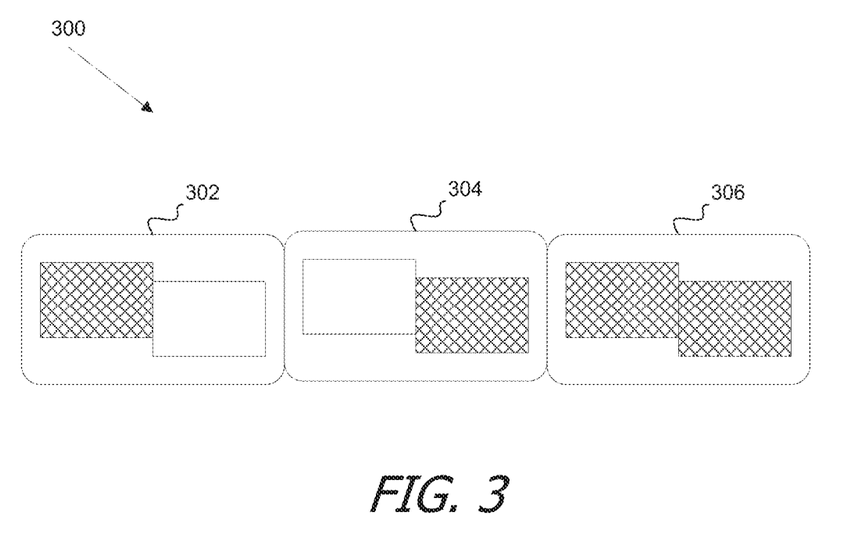
FIG. 3 is a block diagram illustrating a user interface that provides positional orientation information regarding remote displays that can be selected for viewing on a local display, according to an embodiment of the invention.

FIG. 3 is a block diagram illustrating a user interface 300 that provides positional orientation information regarding remote displays that can be selected for viewing on a local display, according to an embodiment of the invention. In the embodiment illustrated, user interface 300 includes three user-selectable icons 302, 304, and 306. However, in alternative embodiments of the invention, a greater or lesser quantity of icons may be included in the user interface. For example, the quantity of icons may depend on the quantity of remote displays 206A-N; the user interface can contain an icon for each remote display, plus one icon for all of the displays combined.

Icons 302-306 all indicate the positional orientations of two remote displays—e.g., remote displays 206A and 206B—relative to each other via rectangles depicted within those icons. Each icon depicts a separate rectangle for each remote display directly connected to the remote computer. Icons 302-306 each show that one remote display is physically located to the left of the other remote display at the remote site, and also that the remote display on the left is elevated slightly related to the remote display on the right. This depiction can help the user to identify the remote displays and distinguish between them, as the depiction presents a view of the remote displays more similar to the one that the user would see if the user were at the remote site instead of at the local computer. If one remote display has different dimensions than the other remote display, then the shape and/or size of the rectangles representing the remote displays within icons 302-306 can be adjusted accordingly to reflect these differing dimensions. One rectangle may have a different width or height than the other rectangle if one remote display has a different width or height than the other remote display. Although in one embodiment icons 302-306 reflect physical arrangements of displays set by a user using a configuration utility, in alternatively embodiments of the invention, icons 302-306 instead reflect a logical arrangement of displays set by such a user using such a configuration utility, and such a logical arrangement might or might not match the actual physical arrangement of the displays. Alternatively, in one embodiment of the invention, the displays can be virtual displays having logical arrangement set by a user using a configuration utility.

In the embodiment of the invention illustrated in FIG. 3, each of icons 302-306 represents a different subset of active remote displays. Shaded rectangles can indicate active remote displays in the icon, while unshaded rectangles can indicate inactive remote displays in that icon. For example, icon 302 has a shaded left rectangle and an unshaded right rectangle, indicating that if icon 302 is selected (e.g., via a mouse click), then the left remote display will become active and the right remote display will become inactive. In contrast, icon 304 has an unshaded left rectangle and a shaded right rectangle, indicating that if icon 304 is selected, then the left remote display will become inactive and the right remote display will become active. Icon 306 has shaded left and right rectangles, indicating that if icon 306 is selected, then both the left and right remote displays will become active concurrently. In one embodiment of the invention, the user selection of a particular icon from icons 302-306 causes the icon-indicated remote displays to become active and/or inactive. In one embodiment of the invention, contents of, or the images currently shown on, active remote displays are also presented on local display 208, while such contents and images from inactive remote displays are not presented on local display 208. In one embodiment of the invention, the user selection of a particular icon from icons 302-306 causes that particular icon to be highlighted, or to be displayed in reverse video, or to be otherwise visually distinguished from the other icons to indicate the current selection of that particular icon rather than any of the other icons. In one embodiment of the invention, a particular icon from icons 302-306 remains selected and visually distinguished until either that particular icon is unselected (e.g., via a mouse click) or until a different icon from icons 302-306 is selected. Thus, in one embodiment of the invention, at most only one of icons 302-306 is currently selected and visually distinguished at any particular moment.

In one embodiment of the invention, in response to a user's selection of a particular icon from icons 302-306, local computer 204 can cause local display 208 to show a separate frame for each of the active remote displays made active by the selection of the particular icon. Each such frame can contain the contents of, or an image currently being shown on, the active remote display corresponding to that frame. As the images on those active remote displays change, the images shown within the corresponding frames on local display 208 can change accordingly and consistently, such that the frames essentially continuously depict the images that are currently being shown on the corresponding active remote displays at any given moment. In one embodiment of the invention, this continuous updating of the frame contents can be accomplished by remote computer 202 continuously sending, over network 210 to local computer 204, data representing the signals that remote computer 202 is directing to those of remote displays 206A-N that are currently active.

In one embodiment of the invention, the frames discussed above are positioned relative to each other in the same manner in which the corresponding rectangles from the currently selected particular icon, of icons 302-306, are positioned relative to each other. In one embodiment of the invention, the frames discussed above have dimensions and sizes relative to each other that are representative of the dimensions and sizes of the corresponding rectangles from the currently selected particular icon, of icons 302-306. Thus, for example, if icon 302 is currently selected, then local display 208 can present a single frame that has a size and dimensions commensurate with, or scaled based on, the size and dimensions of remote display 206A. For another example, if icon 304 is currently selected, then local display 208 can present a single frame that has a size and dimensions commensurate with, or scaled based on, the size and dimensions of remote display 206B. For yet another example, if icon 306 is currently selected, then local display 208 can present two frames simultaneously, each having sizes and dimensions based on the sizes and dimensions of the remote displays to which those frames correspond. Additionally, each of these frames can be presented at a location on local display 208 that is reflective of the physical orientation and location of that frame's corresponding remote display relative to the other remote display. For example, inasmuch as icons 302-306 depict the left remote display being to the left of and slightly elevated relative to the right remote display, the selection of icon 306 can cause local display 208 to present a frame for remote display 206A that is to the left of and slightly elevated relative to the frame that local display 208 concurrently presents for remote display 206B.

Figure 4:
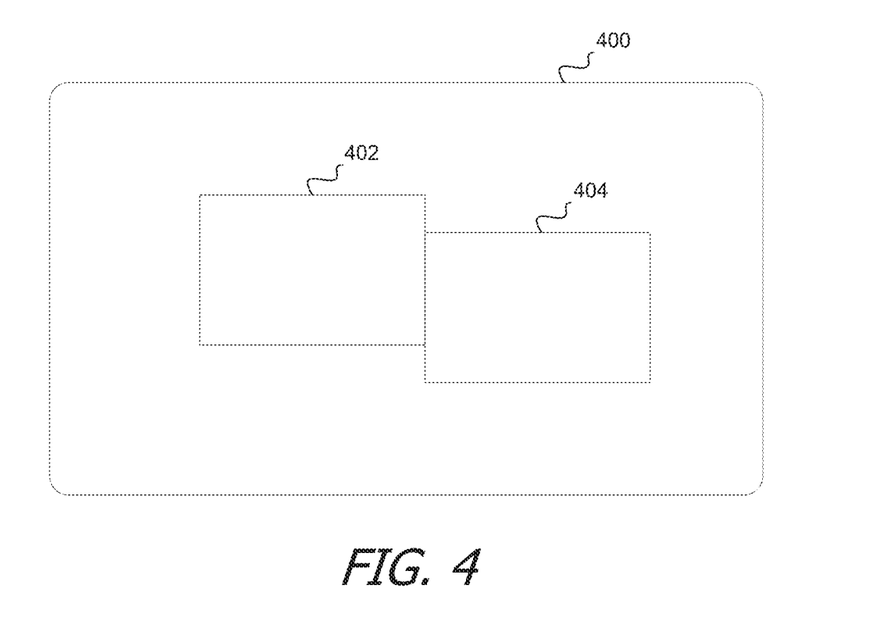
FIG. 4 is a block diagram that illustrates a local display showing two remote display-representing frames and concurrently, according to an embodiment of the invention.

FIG. 4 is a block diagram that illustrates a local display 400 showing two remote display-representing frames 402 and 404 concurrently, according to an embodiment of the invention. In the illustrated example, frame 402 corresponds to remote display 206A, while frame 404 corresponds to remote display 206B. Because remote display 206A is physically oriented to the left of and slightly elevated relative to remote display 206B, frame 402 is oriented to the left of and slightly elevated relative to frame 404.

In one embodiment of the invention, in response to the user of local computer 204 causing (e.g., using a mouse device or other input device) a pointer to hover over a particular one of icons 302-306, local computer 204 can cause a "tooltip" or pop-up text to appear, at least temporarily, near to that particular icon. The tooltip can indicate various characteristics of the remote displays represented by the rectangles in that icon. For example, the tooltip can indicate the pixel dimensions for each of the remote displays within the tooltip text.

Figure 5:
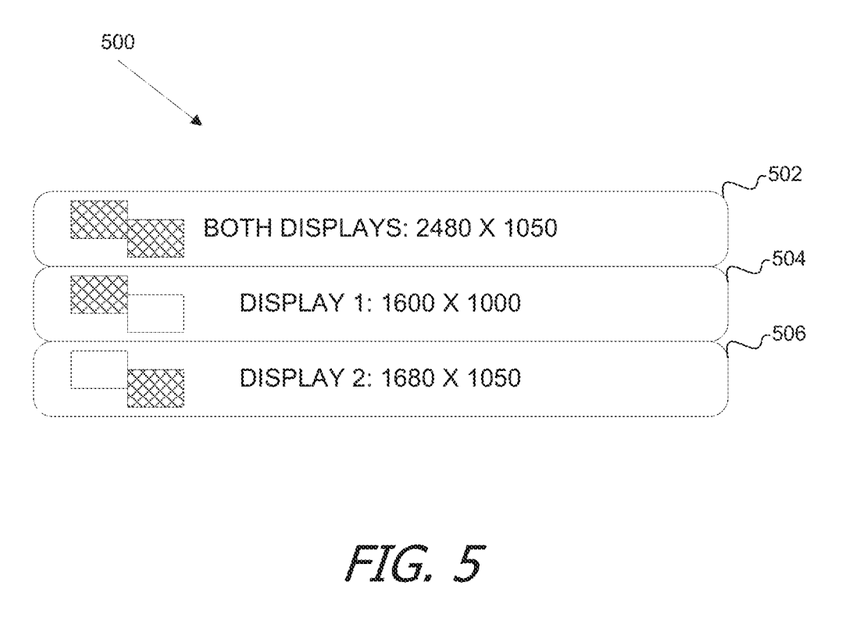
FIG. 5 is a block diagram illustrating an alternative user interface that provides positional orientation information regarding remote displays that can be selected for viewing on a local display, according to an embodiment of the invention.

FIG. 5 is a block diagram illustrating an alternative user interface 500 that provides positional orientation information regarding remote displays that can be selected for viewing on a local display, according to an embodiment of the invention. As illustrated, user interface 500 includes icons 502, 504, and 506. Each of icons (or menu options) 502-506 represents a different subset of active ones of remote displays 206A-N, similar to the manner in which icons 302-306 of FIG. 3 represent such subsets. Icon 502 represents a subset in which remote displays 206A and 206B are both active. Icon 504 represents a subset in which remote display 206A is active and remote display 206B is inactive. Icon 506 represents a subset in which remote display 206A is inactive and remote display 206B is active. In an embodiment of the invention, user selection of a particular one of icons 502-506 can cause local display 208 to present frames corresponding to the active displays represented by the particular icon, in a manner similar to that discussed above in connection with FIG. 3.

Unlike icons 302-306 of FIG. 3, however, icons 502-506 of FIG. 5 additionally contain text indicating names or identities of the remote displays whose local viewing will be activated by the user selection of those icons. Furthermore, each of icons 502-506 contains text indicating the pixel dimensions of the corresponding active remote display(s) depicted by shaded rectangles in that icon. Icon 502 contains text indicating that user selection of icon 502 will cause the activation of both remote displays, which together have combined pixel dimensions of 2480×1050. Icon 504 contains text indicating that user selection of icon 504 will cause the activation of the left remote display (and the deactivation of the right remote display), which has pixel dimensions of 1600×1000. Icon 506 contains text indicating that user selection of icon 506 will cause the activation of the right remote display (and the deactivation of the left remote display), which has pixel dimensions of 1680×1050. Although one embodiment of the invention involves the presentation of user-selectable icons containing text and a pictorial representation of positional orientations of remote displays relative to each other, as in FIG. 5, alternative embodiments of the invention instead can present user-selectable icons having a similar purpose and functionality without containing such pictorial representations. For example, in one alternative embodiment of the invention, user-selectable textual menu options can textually convey positional orientation information of corresponding remote displays using words such as "left," "right," "top," "bottom," etc. For a more specific example, the display referred to as "Display 1" in FIG. 5 might be referred to instead as "left display," while the display referred to as "Display 2" in FIG. 5 might be referred to instead as "right display," thereby conveying to the user of local computer 204 that remote display 206A is physically positioned and oriented to the left of remote display 206B at the remote site.

Network-Based Communications for User Interface Generation

Figure 6:
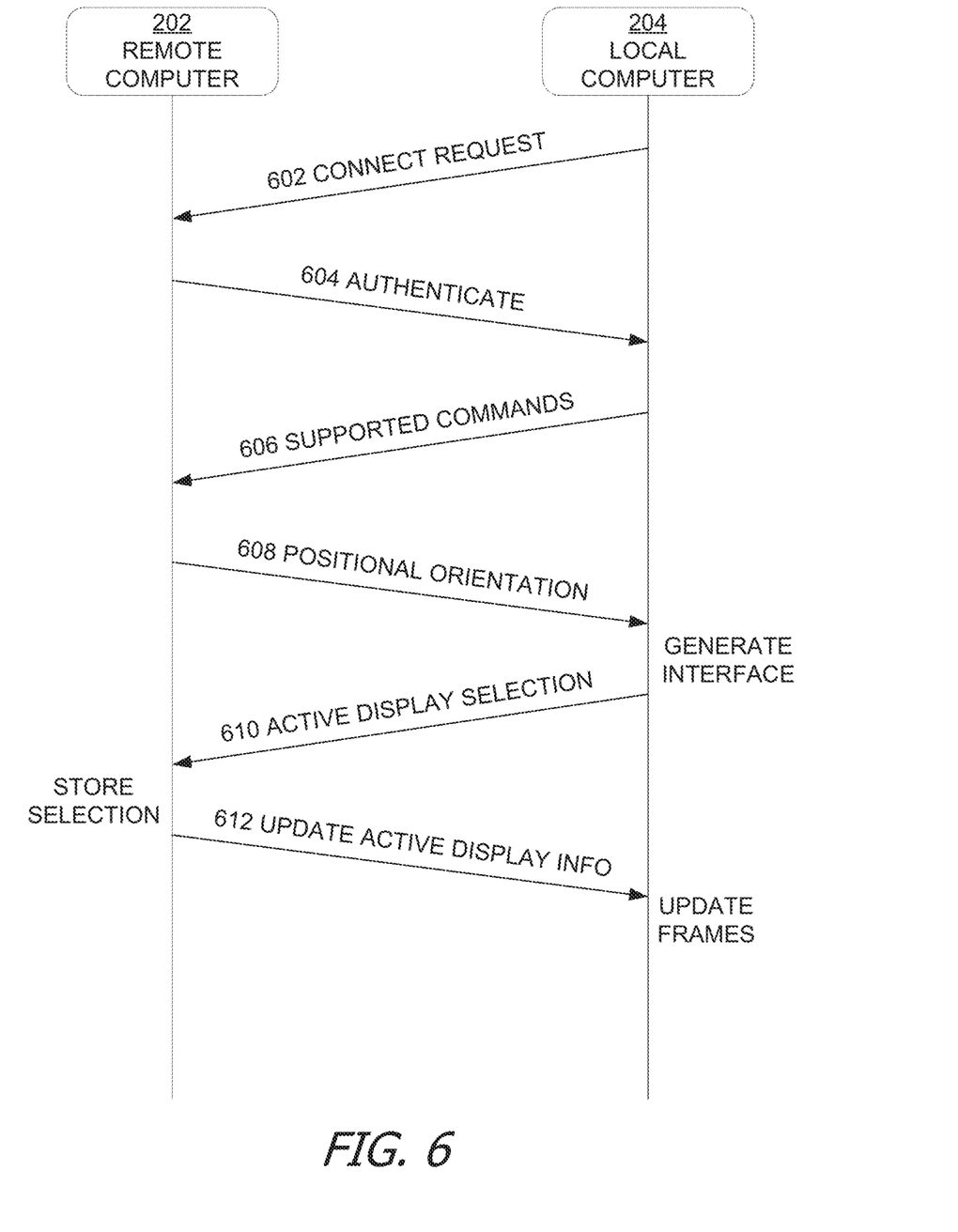
FIG. 6 is a diagram illustrating a sequence of communications between a local computer and a remote computer via a network in order to convey information sufficient for the local computer to cause a local display to present a positionally informative user interface, according to an embodiment of the invention.

FIG. 6 is a diagram illustrating a sequence 600 of communications between local computer 204 and remote computer 202 via network 210 in order to convey information sufficient for local computer 204 to cause local display 208 to present the positionally informative user interface discussed above, according to an embodiment of the invention. In step 602, local computer 204 (potentially executing a client application that communicates with a server application executing on remote computer 202) sends a log-on request to remote computer 202. The request can specify a username and password, for example. In step 604, remote computer 202 authenticates the user of local computer 204 based on the information specified in the request, and sends an authentication success message to local computer 204. In step 606, local computer 204 sends, to remote computer 202, a list of commands supported by local computer 204. These commands can indicate, for example, the types of remote display characteristics that local computer 204 is capable of understanding. Such types of characteristics may include, for example, positional orientation information, pixel resolution information, pixel density information, etc. Remote computer 202 can use this list of commands to determine the types of information that remote computer 202 should send to local computer 204 in subsequent interactions.

In one embodiment of the invention, remote computer 202 stores and maintains information regarding the positional orientations and other characteristics of each of remote displays 206A-N. For example, in one embodiment of the invention, the positional orientation of each of remote displays 206A-N can be represented by numerical coordinates that indicate physical positions of upper-left and lower-right corners of those remote displays in physical space at the remote site. An administrator of remote computer 202 can establish this positional orientation information manually using a tool resident on remote computer 202. As is discussed above, although in one embodiment of the invention the positional orientation information reflects the actual physical positional orientation of physical displays, in alternative embodiments of the invention, the administrator can use such a tool to establish alternative positional orientation information that can reflect a logical arrangement of the displays that differs from the actual physical arrangement of the displays. Indeed, in one alternative embodiment of the invention, the positional orientation information can refer to virtual displays that do not physically exist, but are logically established, dimensioned, and oriented by the administrator using such a tool. In one embodiment of the invention, stored characteristics of remote displays 206A-N, including positional orientation information, also can be modified at any time—for example, in concert with the physical addition or removal or movement of any remote display to, from, or within remote displays 206A-N—and updated in storage using such a tool, or via automatic detection mechanisms. In one embodiment of the invention, the updating of the stored characteristics causes remote computer 202 to send updated data to local computer 204 in order to enable local computer 204 to cause local display 208 to update its user interface and displayed frames with the updated characteristics. Thus, in one embodiment of the invention, if a remote display is added or removed or physically moved, then this fact can be detected, and local computer 204 can responsively generate updated icons for the user interface that local display 208 presents to the user.

In step 608, remote computer 202 sends, over network 210 to local computer 204, data indicating positional orientation information and other characteristics of remote displays 206A-N. In step 610, local computer 204 receives this data and, based at least in part on this data, generates a user interface including positionally informative icons of the kind described above (e.g., in connection with FIG. 3 and/or FIG. 5). Local computer 204 causes local display 208 to present the user interface. Local computer 204 can detect a user's selection of a particular icon from the positionally informative icons included in the presented user interface. Also in step 610, responsive to the user selection of a positionally informative icon from the user interface, local computer 204 sends, over network 210 to remote computer 202, information indicating which subset of remote displays 206A-N has been selected to be active for remote viewing. In step 612, remote computer 202 receives and stores this selection information. Thereafter, remote computer 202 can use this selection information to determine which of the signals that remote computer 202 sends to various ones of remote displays 206A-N also should be relayed across network 210 to local computer 202; in one embodiment of the invention, remote computer 202 only sends, to local computer 202, image-representing data for those of remote displays 206A-N that were designated as being active in step 610.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof Further, while the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded and stored on various computer readable storage media; suitable media include magnetic disk or tape, optical storage media such as compact disk (CD) or DVD (digital versatile disk), flash memory, and other non-transitory media. Computer readable media encoded with the program code can be packaged with a compatible electronic device, or the program code can be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method, comprising:
   at a first electronic device with a display:
      receiving via a network, from a remote electronic device connected to a first remote display and a second remote display, information that represents a position of the first remote display relative to the second remote display; and
      displaying, on the display of the first electronic device, one or more icons, wherein:
         a respective single icon of the one or more icons includes:
            a representation of the first remote display,
            a representation of the second remote display,
            a visual indication for the first remote display of whether the first remote display is active or inactive,
            a visual indication for the second remote display of whether the second remote display is active or inactive; and
            a position of the representation of the first remote display relative to a position of the representation of the second remote display on the respective icon illustrates the position of the first remote display relative to the second remote display.

2. The method of claim 1, including:
   detecting selection of a first icon of the one or more icons; and,
   in response to detecting selection of the first icon of the one or more icons:
      displaying, on the display of the first electronic device, images being presented on the first remote display when the visual indication for the first remote display is active for the first icon;
      foregoing displaying, on the display of the first electronic device, images being presented on the first remote display when the visual indication for the first remote display is inactive for the first icon;
      displaying, on the display of the first electronic device, images being presented on the second remote display when the visual indication for the second remote display is active for the first icon; and
      foregoing displaying, on the display of the first electronic device, images being presented on the second remote display when the visual indication for the second remote display is inactive for the first icon.

3. The method of claim 1, wherein a size of the representation of the first remote display relative to a size of the representation of the second remote display on the respective icon illustrates the size of the first remote display relative to the size of the second remote display.

4. The method of claim 1, wherein the one or more icons include a first icon that includes representations of the first remote display and the second remote display and a second icon that includes representations of the first remote display and the second remote display, the first icon and the second icon are displayed concurrently, and the method includes:
  detecting selection of a respective icon of the one or more icons; and,
  in response to detecting selection of the respective icon of the one or more icons:
    in accordance with a determination that the respective icon is the first icon, displaying, on the display of the first electronic device, images being presented on the first remote display without displaying, on the display of the first electronic device, images being presented on the second remote display; and,
    in accordance with a determination that the respective icon is the second icon, concurrently displaying, on the display of the first electronic device, images being presented on the first remote display and images being presented on the second remote display.

5. The method of claim 4, wherein:
  the first icon includes a graphical representation of the first remote display and the second remote display and a text description of the first remote display without a text description of the second remote display; and
  the second icon includes a graphical representation of the first remote display and the second remote display and a text description of the first remote display and the second remote display.

6. The method of claim 4, wherein:
  in the first icon, a graphical representation of the first remote display is visually distinguished from a graphical representation of the second remote display using a first value of a respective graphical property for the graphical representation of the first remote display and a second value of the respective graphical property for the graphical representation of the second remote display, wherein the second value is different from the first value; and,
  in the second icon, a graphical representation of the first remote display and a graphical representation of the second remote display have the same value for the respective graphical property.

7. The method of claim 4, wherein the one or more icons include a third icon that includes representations of the first remote display and the second remote display and is displayed concurrently with the first icon and the second icon, and the method includes:
  detecting selection of a respective icon of the one or more icons; and,
  in response to detecting selection of the respective icon of the one or more icons, in accordance with a determination that the respective icon is the third icon, displaying, on the display of the first electronic device, images being presented on the second remote display without displaying, on the display of the first electronic device, images being presented on the first remote display.

8. The method of claim 7, wherein the third icon includes a graphical representation of the first remote display and the second remote display and a text description of the second remote display without a text description of the first remote display.

9. A first electronic device, comprising:
  a display;
  one or more processors;
  memory; and
  one or more programs, wherein the one or more programs are stored in the memory and configured to be executed by the one or more processors, the one or more programs including instructions for:
    receiving via a network, from a remote electronic device connected to a first remote display and a second remote display, information that represents a position of the first remote display relative to the second remote display; and
    displaying, on the display of the first electronic device, one or more icons, wherein:
      a respective single icon of the one or more icons includes:
        a representation of the first remote display,
        a representation of the second remote display,
        a visual indication for the first remote display of whether the first remote display is active or inactive,
        a visual indication for the second remote display of whether the second remote display is active or inactive; and
        a position of the representation of the first remote display relative to a position of the representation of the second remote display on the respective icon illustrates the position of the first remote display relative to the second remote display.

10. The device of claim 9, wherein the one or more programs further include instructions for:
  detecting selection of a first icon of the one or more icons; and,
  in response to detecting selection of the first icon of the one or more icons:
    displaying, on the display of the first electronic device, images being presented on the first remote display when the visual indication for the first remote display is active for the first icon;
    foregoing displaying, on the display of the first electronic device, images being presented on the first remote display when the visual indication for the first remote display is inactive for the first icon;
    displaying, on the display of the first electronic device, images being presented on the second remote display when the visual indication for the second remote display is active for the first icon; and
    foregoing displaying, on the display of the first electronic device, images being presented on the second remote display when the visual indication for the second remote display is inactive for the first icon.

11. The device of claim 9, wherein a size of the representation of the first remote display relative to a size of the representation of the second remote display on the respective icon illustrates the size of the first remote display relative to the size of the second remote display.

12. The device of claim 9, wherein the one or more icons include a first icon that includes representations of the first remote display and the second remote display and a second icon that includes representations of the first remote display and the second remote display, the first icon and the second icon are displayed concurrently, and the device includes instructions for:
  detecting selection of a respective icon of the one or more icons; and,
  in response to detecting selection of the respective icon of the one or more icons:
    in accordance with a determination that the respective icon is the first icon, displaying, on the display of the first electronic device, images being presented on the first remote display without displaying, on the display of the first electronic device, images being presented on the second remote display; and,
in accordance with a determination that the respective icon is the second icon, concurrently displaying, on the display of the first electronic device,
images being presented on the first remote display and images being presented on the second remote display.

13. The device of claim 12, wherein:
the first icon includes a graphical representation of the first remote display and the second remote display and a text description of the first remote display without a text description of the second remote display; and
the second icon includes a graphical representation of the first remote display and the second remote display and a text description of the first remote display and the second remote display.

14. The device of claim 12, wherein:
in the first icon, a graphical representation of the first remote display is visually distinguished from a graphical representation of the second remote display using a first value of a respective graphical property for the graphical representation of the first remote display and a second value of the respective graphical property for the graphical representation of the second remote display, wherein the second value is different from the first value; and,
in the second icon, a graphical representation of the first remote display and a graphical representation of the second remote display have the same value for the respective graphical property.

15. The device of claim 12, wherein the one or more icons include a third icon that includes representations of the first remote display and the second remote display and is displayed concurrently with the first icon and the second icon, and the device includes instructions for:
detecting selection of a respective icon of the one or more icons; and,
in response to detecting selection of the respective icon of the one or more icons, in accordance with a determination that the respective icon is the third icon, displaying, on the display of the first electronic device, images being presented on the second remote display without displaying, on the display of the first electronic device, images being presented on the first remote display.

16. The device of claim 15, wherein the third icon includes a graphical representation of the first remote display and the second remote display and a text description of the second remote display without a text description of the first remote display.

17. A non-transitory computer readable storage medium storing one or more programs, the one or more programs comprising instructions, which when executed by a first electronic device with a display, cause the device to:
receive via a network, from a remote electronic device connected to a first remote display and a second remote display, information that represents a position of the first remote display relative to the second remote display; and
display, on the display of the first electronic device, one or more icons, wherein:
a respective single icon of the one or more icons includes:
a representation of the first remote display,
a representation of the second remote display,
a visual indication for the first remote display of whether the first remote display is active or inactive,
a visual indication for the second remote display of whether the second remote display is active or inactive; and
a position of the representation of the first remote display relative to a position of the representation of the second remote display on the respective icon illustrates the position of the first remote display relative to the second remote display.

18. The computer readable storage medium of claim 17, including instructions, which when executed by the electronic device with the display, cause the device to:
detect selection of a first icon of the one or more icons; and,
in response to detecting selection of the first icon of the one or more icons:
display, on the display of the first electronic device, images being presented on the first remote display when the visual indication for the first remote display is active for the first icon;
forego display, on the display of the first electronic device, images being presented on the first remote display when the visual indication for the first remote display is inactive for the first icon;
display, on the display of the first electronic device, images being presented on the second remote display when the visual indication for the second remote display is active for the first icon; and
forego display, on the display of the first electronic device, images being presented on the second remote display when the visual indication for the second remote display is inactive for the first icon.

19. The computer readable storage medium of claim 17, wherein a size of the representation of the first remote display relative to a size of the representation of the second remote display on the respective icon illustrates the size of the first remote display relative to the size of the second remote display.

20. The computer readable storage medium of claim 17, wherein the one or more icons include a first icon that includes representations of the first remote display and the second remote display and a second icon that includes representations of the first remote display and the second remote display, the first icon and the second icon are displayed concurrently, and the computer readable storage medium includes instructions, which when executed by the first electronic device with the display, cause the device to:
detect selection of a respective icon of the one or more icons; and,
in response to detecting selection of the respective icon of the one or more icons:
in accordance with a determination that the respective icon is the first icon, display, on the display of the first electronic device, images being presented on the first remote display without displaying, on the display of the first electronic device, images being presented on the second remote display; and,
in accordance with a determination that the respective icon is the second icon, concurrently display, on the display of the first electronic device,
images being presented on the first remote display and images being presented on the second remote display.

21. The computer readable storage medium of claim 20, wherein:
the first icon includes a graphical representation of the first remote display and the second remote display and a text description of the first remote display without a text description of the second remote display; and the second icon includes a graphical representation of the first remote display and the second remote display and a text description of the first remote display and the second remote display.

22. The computer readable storage medium of claim 20, wherein:
in the first icon, a graphical representation of the first remote display is visually distinguished from a graphical representation of the second remote display using a first value of a respective graphical property for the graphical representation of the first remote display and a second value of the respective graphical property for the graphical representation of the second remote display, wherein the second value is different from the first value; and,
in the second icon, a graphical representation of the first remote display and a graphical representation of the second remote display have the same value for the respective graphical property.

23. The computer readable storage medium of claim 20, wherein the one or more icons include a third icon that includes representations of the first remote display and the second remote display and is displayed concurrently with the first icon and the second icon, and the computer readable storage medium includes instructions, which when executed by the first electronic device with the display, cause the device to:
detect selection of a respective icon of the one or more icons; and,
in response to detecting selection of the respective icon of the one or more icons, in accordance with a determination that the respective icon is the third icon, display, on the display of the first electronic device, images being presented on the second remote display without displaying, on the display of the first electronic device, images being presented on the first remote display.

24. The computer readable storage medium of claim 23, wherein the third icon includes a graphical representation of the first remote display and the second remote display and a text description of the second remote display without a text description of the first remote display.

* * * * *